Patented Apr. 21, 1925.

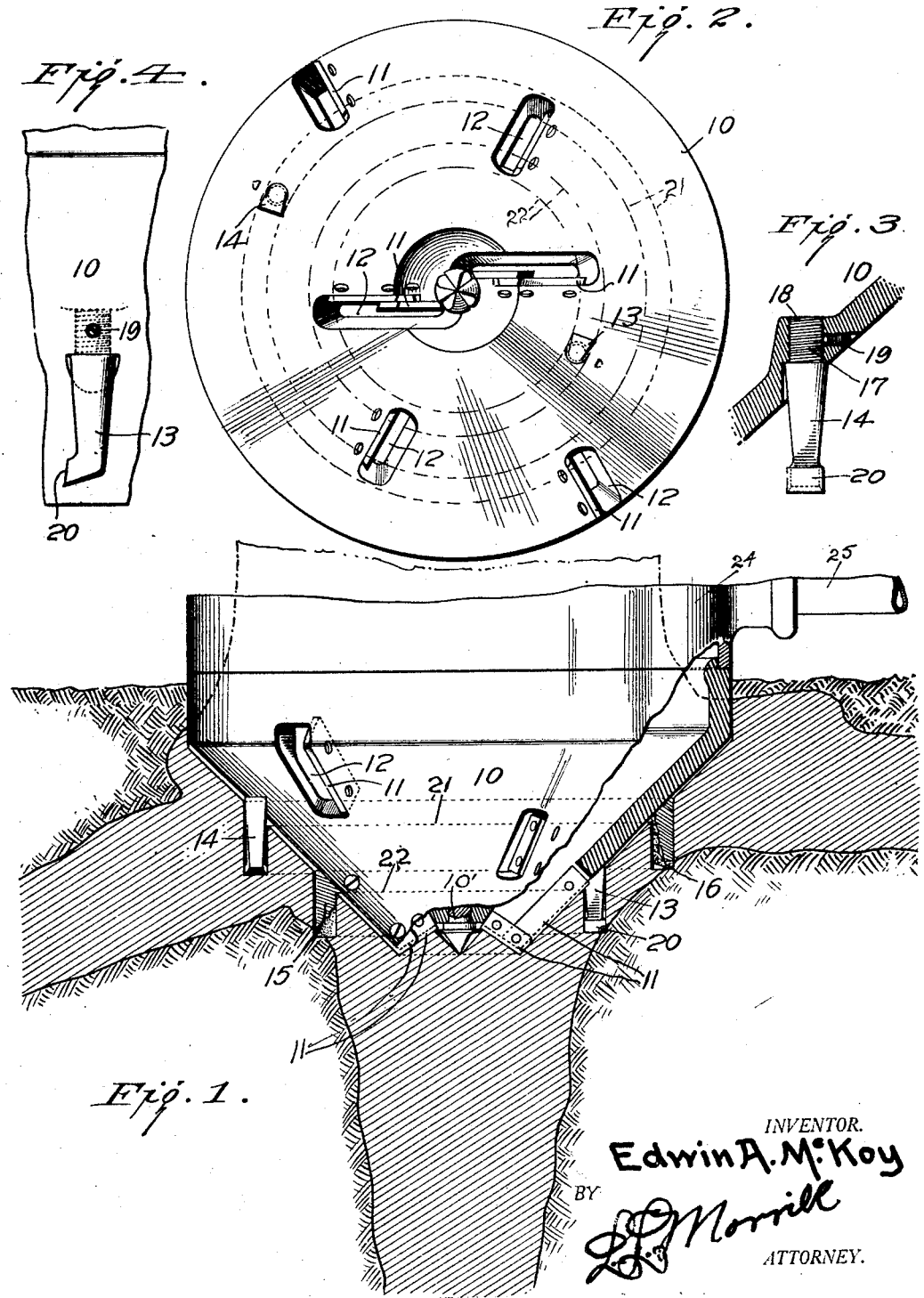

1,534,858

UNITED STATES PATENT OFFICE.

EDWIN A. McKOY, OF NEW ORLEANS, LOUISIANA.

SLITTING CUTTER HEAD.

Application filed May 23, 1921. Serial No. 471,627. Renewed September 30, 1924.

*To all whom it may concern:*

Be it known that I, EDWIN A. McKOY, a citizen of the United States, residing at New Orleans, in the parish of Orleans and State of Louisiana, have invented certain new and useful Improvements in Slitting Cutter Heads, of which the following is a specification.

This invention relates to slitting cutter heads, and has for an object to provide a cutter head of the hollow conical type, with cutters adapted to throw the cuttings within the hollow of the head and with additional cutters adapted to cut slits of annular form in advance of the conical cut of the head proper.

The object of the present invention is to provide a cutter head more particularly adapted for disintegrating standing stumps, and to so sever the stump body from the roots as to make the removal of the roots convenient and economical after the body of the stump has been removed.

The present invention is intended more particularly for disintegrating turpentine stumps, or the standing stumps of turpentine trees which are uniformly provided with a tap root extending directly downward from, and generally substantially concentric with the body of the stump and other lateral roots extending outwardly radially from the body of the stump or tap root adjacent to the surface of the ground.

The present invention is, therefore, to provide a cutter head which will disintegrate and conserve the material of the stump body, and when the body has been removed and the head is working below the surface of the ground, to form slits which will sever the lateral roots from the tap root to make the removal of the lateral roots convenient, the cutting of the tap root being sufficiently far below the surface of the ground to make cultivation over the top of such tap root possible.

With these and other objects in view, the device comprises certain novel parts, elements, units and combinations, as will be hereinafter more fully described and claimed.

In the drawings—

Figure 1 is a view partly in side elevation and partly in section, of a cutter head, showing its relation to the roots of a stump which has been severed from the roots.

Figure 2 is a bottom plan view of the cutter head.

Figure 3 is a sectional detail view of the manner of attaching one of the slitters to the conical head.

Figure 4 is a detail view of the slitter attached to the cutter head in side elevation.

Like characters of reference indicate corresponding parts throughout the several views.

The improved cutter head which forms the subject matter of this application may be of various types, but preferably has a conical or conoidal body 10 with a plurality of knives 11 secured thereto and having their cutting edges exerted through openings 12. While in the drawings two sets of three knives each have been shown arranged in staggered relation, the number or arrangement of the knives forms no part of the present invention, and is no limitation upon the claims or protection secured hereby.

The conical head is formed hollow so that the openings 12 communicate with such hollow interior and a central shaft 10' is provided as the axis of rotation and to which power from any convenient or available source is applied to rotate the head.

Whatever the arrangement of the knives, a plurality of slitting cutters 13 and 14 are secured to the body of the head in parallelism with the axis of rotation of the head. Preferably, more than one of these cutters is provided, although the present invention is not limited to the number, which may be any number found desirable.

As shown in the drawings, two of these slitters are provided, arranged at different distances from the center of rotation, to cut two concentric slits 15 and 16, respectively, in the material acted upon. The advantage of providing more than one of such cutters is that the arrangement of the laterals to the tap root, while following substantial uniformity, are of course, not always uniform, and a single slitter might, under some circumstances, fail to completely sever the laterals from the tap root. As will be seen especially from Figure 1, therefore, two annular slits are formed whereby the laterals will almost without fail be severed from the tap, irrespective of their variation.

The progress or advancement of the cutter head itself to a limit greater than that shown at Figure 1 would, of course, serve the same purpose, but intermediate the several roots the cutter head would gather up dirt, sand and the like, which not only would contaminate the comminuted wood, but also would dull the knives of the cutter head. The length and proportion of the slitters to the cutter head can be varied, according to circumstances, it being necessary only to cut the slits in such position and of such depth as will insure the severance of the laterals from the tap root with the minimum gathering of dirt and extraneous matter into the cutter head. At Figure 1, means is shown conventionally for removing by a suitable housing 24 and conduit 25 the material from the hollow interior of the cutter head, but this forms no essential part of the present invention, and its description will not add to the clarity of understanding.

The slitting cutters may be secured to the tapered or conical sides of the cutter head in any approved manner. As here shown, the slitters are provided with threaded shanks 17 which are inserted in threaded sockets 18 in the sides of the cutter head 10, and are maintained in proper relation by set screws 19. The cutters themselves may be of any shape to perform their function, but preferably of the shape of milling tools or the like, substantially as shown at 20, whereby a clear annular cut is produced by the rotation of these knives about the shaft 10'.

It is obvious that these slitters, by reason of their position, will come into engagement with dirt, stones and the like, and their removability for the purpose of sharpening is desirable. Constructed as shown in the drawings, they may be easily and quickly removed and replaced, but it is to be understood that the disclosure of this means is no limitation upon any means for attaching the slitters to the cutter head, as circumstances and engineering requirements may make desirable.

It is also well known that in such cutter heads especially where they come in contact with such dirt, stones and the like, the corners of the knives or the ends of the cutting edges become dulled and blunted sooner than the intermediate portions. The arrangement of the staggered knives relative to the slitters in the present instance is such that the corners are in each case protected by the slitter and travel in the path cleared by the slitter whereby the corners are protected from dulling to any greater extent than the balance of the cutting edge. This is shown in the drawings, the dotted lines 21 indicating the path of the outer slitter, in which path the inner corner of the outer, and the outer corner of the intermediate knives travel, while the dotted lines 22 indicate the path of the inner slitter, protecting in like manner the outer ends of the inner, and the inner ends of the intermediate knives.

I claim:

1. A cutter head comprising a rotating body, knives carried by the body positioned to cut spaced annuli, and a slitter axially in advance of the knives positioned to cut a groove between the annuli.

2. A cutting head comprising a hollow body having openings therethrough, knives positioned in the openings adapted to direct the cuttings into the hollow of the head, and slitting cutters projecting in advance of the knives adapted to remove material in advance of the surface produced by the knives.

3. A cutter head comprising a conoidal body having a plurality of cutters about its conoidal surface adapted to cut a surface substantially complementary to the surface of the conoid, and slitting cutters projecting from the surface of the conoid in substantial parallelism with the axis of rotation and adapted to cut annular slits in advance of the cut of the knives.

4. A cutter head comprising a hollow conoidal body having slots therein, knives located in the slots adapted to cut a surface substantially complementary to the taper of the conoid and discharge material within the head, and a slitting cutter extending beyond the cutter head substantially parallel with the axis of rotation and adapted to cut annular slits in advance of the conoidal cut of the head.

5. A cutter head comprising a conoidal body having a plurality of slots therein in spaced relation, knives carried by the cutter head and extending through the slots, and slitters carried by the cutter head cutting a slit in advance of the interval between the staggered knives.

6. A cutter head comprising a conoidal body having a plurality of slots therein in spaced radial relation, knives carried by the cutter head and extending through the slots, and a slitter carried by the cutter head with the cutting edge positioned radially between and axially in advance of the cutting edges of said knives.

In testimony whereof I affix my signature.

EDWIN A. McKOY.